US008973566B2

(12) United States Patent
Park et al.

(10) Patent No.: US 8,973,566 B2
(45) Date of Patent: Mar. 10, 2015

(54) WORKPIECE FOR FRAME GANG SAW, METHOD FOR CUTTING THE WORKPIECE, AND PRODUCT CUT BY THE METHOD

(75) Inventors: Hee-Dong Park, Gyunggi-do (KR); Nam-Kwang Kim, Chungcheongbuk-do (KR)

(73) Assignee: Ehwa Diamond Industrial Co., Ltd., Osan, Kyungki-Do (KR)

( * ) Notice: Subject to any disclaimer, the term of this patent is extended or adjusted under 35 U.S.C. 154(b) by 548 days.

(21) Appl. No.: 13/141,471

(22) PCT Filed: Dec. 23, 2009

(86) PCT No.: PCT/KR2009/007734

§ 371 (c)(1), (2), (4) Date: Jun. 22, 2011

(87) PCT Pub. No.: WO2010/074513

PCT Pub. Date: Jul. 1, 2010

(65) Prior Publication Data

US 2011/0253121 A1 Oct. 20, 2011

(30) Foreign Application Priority Data

Dec. 23, 2008 (KR) ........................ 10-2008-0132553

(51) Int. Cl.
*B28D 1/06* (2006.01)
*B32B 3/30* (2006.01)

(52) U.S. Cl.
CPC ........................................ *B28D 1/06* (2013.01)
USPC ............................................ 125/17; 428/167

(58) Field of Classification Search
CPC ........................................................ B28D 1/06
USPC ........................ 451/41; 125/16.01, 17, 18, 38
IPC ....... B28D 1/12, 1/06; B23D 61/12; B27B 3/10
See application file for complete search history.

(56) References Cited

U.S. PATENT DOCUMENTS 3,265,056 A * 8/1966 Eberhard et al. ........... 125/16.01
3,384,064 A * 5/1968 Miller ............................ 125/17

(Continued)

FOREIGN PATENT DOCUMENTS

| | | | | |
|---|---|---|---|---|
| CN | 101394977 A | 3/2009 | | |
| JP | 7-232319 A | 5/1995 | | |
| JP | 07232319 A * | 9/1995 | | B28D 5/00 |
| JP | 9-38960 A | 2/1997 | | |
| KR | 10-0466510 | 1/2005 | | |
| KR | 10-0564271 | 3/2006 | | |
| KR | 10-0680851 | 2/2007 | | |

OTHER PUBLICATIONS

Jp 07232319A - English Machine Translation of Jp 07232319.*
International Search Report for corresponding patent application PCT/KR2009/007734 dated Jul. 8, 2010.
Office Action corresponding to Chinese patent application No. 200980152392.0 mailed Jul. 1, 2013.

*Primary Examiner* — Joseph J Hail
*Assistant Examiner* — Marc Carlson
(74) *Attorney, Agent, or Firm* — Renner, Otto, Boisselle & Sklar, LLP

(57) ABSTRACT

There is provided a method of cutting or drilling workpiece including stone such as marble and granite, brick, concrete and asphalt, using a frame gang saw. There are provided a workpiece cut by a frame gang saw that includes one or a plurality of blades having multiple cutting tips or that includes a blade without including a cutting tip; a method of cutting the workpiece by using a frame gang saw; and a product provided by the cutting method. The workpiece is provided to include one or more grooves into which at least a portion of at least one cutting tip among the multiple cutting tips or at least a portion of the blade without a cutting tip is inserted and which is formed in a surface thereof. Here, an initial cutting time on a workpiece may be shortened to greatly improve productivity and the quality of a product and a lifespan of a frame gang saw blade may be improved by significantly decreasing deflection in the blade.

10 Claims, 4 Drawing Sheets

(56) References Cited

U.S. PATENT DOCUMENTS

| | | | | | |
|---|---|---|---|---|---|
| 3,976,045 | A | * | 8/1976 | Coggins, Jr. | 125/12 |
| 4,105,012 | A | * | 8/1978 | Hini et al. | 125/16.01 |
| 4,188,934 | A | * | 2/1980 | Reinhardt et al. | 125/4 |
| 5,131,378 | A | * | 7/1992 | Marocco | 125/16.01 |
| 7,089,925 | B1 | * | 8/2006 | Lin et al. | 125/21 |
| 7,096,863 | B2 | * | 8/2006 | Dossena et al. | 125/16.01 |
| 7,347,766 | B2 | * | 3/2008 | Nitta et al. | 451/11 |
| 2003/0127086 | A1 | * | 7/2003 | Brauninger et al. | 125/16.01 |
| 2007/0042685 | A1 | * | 2/2007 | Jakobuss et al. | 451/41 |
| 2009/0229592 | A1 | * | 9/2009 | Kim et al. | 125/18 |

* cited by examiner

WORKPIECE FOR FRAME GANG SAW, METHOD FOR CUTTING THE WORKPIECE, AND PRODUCT CUT BY THE METHOD

TECHNICAL FIELD

The present invention relates to a method of cutting or drilling a brittle workpiece, including stone such as marble or granite, brick, concrete and asphalt, using a frame gang saw, and more particularly, to a workpiece for a frame gang saw, having brittle characteristics, such as stone, i.e., marble or granite, brick, concrete and asphalt, and a method of cutting the same and a product provided by the cutting method.

BACKGROUND ART

In general, a cutting tool is configured of a cutting tip including an abrasive, directly performing a cutting operation, and a body (core) to which the cutting tip is provided to be fixed.

The body is generally disk shaped, in another embodiment, may be formed in a linear form such as a frame gang saw.

Ordinarily a frame gang saw has been widely used for cutting a workpiece, for example, a large-sized block of concrete, marble, granite, sandstone, limestone, or the like, into a plurality of thin slabs.

As a method of using a frame gang saw there maybe provided a method of using a frame gang saw by spraying an abrasive such as a grain form steel shot and a method of using a frame gang saw by way of a cutting tip including an abrasive fixed to a body thereof.

In the frame gang saw, a frame is fitted with a linear form body, in which linearity may be maintained by applying tension to the body.

In addition to the frame gang saw used for the cutting of a large-sized workpiece, a large sized circular saw blade, a wire saw, a band saw, or the like may be used.

The large sized circular saw blade is in the form of a disk to perform a stabilized cutting operation at a rapid cutting speed and is configured to include multiple bodies so as to cut several sheets or plates at a time. Meanwhile, in the case that a workpiece has a relatively large thickness, and thus a diameter of the body in the disk form saw is relatively great, the thickness of the body of the saw blade should be increased and an overall system should have a relatively large volume in order to realize stabilization of the body of the saw blade. That is, there may be increased cutting loss of relatively expensive material during the cutting work on a workpiece.

Generally, a wire saw is used at the time of mining stone, but recently the wire saw has been under development for use in cutting quarried stone into a plurality of slabs.

However, to date, in the case of the wire saw, a high unit-price in the production therefor and a large amount of cutting loss at the time of cutting a workpiece are increased.

In the case of frame gang saw, a body (hereinafter, referred to as 'blade') may penetrate into the inside of the workpiece while performing a cutting operation without a limitation with regard to the height of workpiece. That is, the frame gang saw is widely used for cutting a large-sized block of stone into a plurality of slabs.

However, since unlike other cutting methods, the frame gang saw performs a cutting operation through a method of performing a cutting operation using reciprocal movement therein; for example, when the cutting operation is performed using a cutting tip provided to include abrasive grains such as diamond particles or the like, a tail supporting the abrasive grains is not formed, thus causing abrasive grains to be detached therefrom in early stage. The method of using a cutting tip fitted with the body is generally used in cutting marble having a comparatively low hardness, and, in a case of cutting granite or the like, a method of performing a cutting operation by spraying an abrasive such as a steel shot in the form of a grain together with water thereto is principally used.

The frame gang saw is universally configured as a reciprocating multiplane type, for example, having about 250 blades, of in which each blade may have a length of 3 m or more, a thickness of 2 mm to 5 mm, and a height of 50 mm to 200 mm.

A block of granite or marble is cut into a plurality of slabs using a frame gang saw and the slabs are then polished to be completed as products such as tiles or blocks.

In the case of a deviation in the thickness of slabs, when a deviation in the thickness of a slab is less than 1.5 mm, the slab may be regarded as being sufficiently flat, while, in a case in which a deviation in the thickness of a slab is greater than about 2 mm, the slab is not polishing-processed but generally scrap-processed.

In order to satisfy the above-mentioned conditions demanded for the quality of final granite or marble products, a blade should not be deviated from a vertical path in which a block of granite or marble is cut in the cutting operation. The deviation of a blade from a cutting path may occur when force is locally applied to the blade to thus cause the blade to be distorted or bent, from which the deviation from the cutting path may occur from a linear path, leading to an excess in an allowable level of thickness deviation in slabs.

Deformation of the blade may bring about permanent wear of blade due to buckling and breakage.

One factor generating local force, from which a deviation of a blade from a cutting path may occur, maybe an uneven surface state, namely, a non-uniform thickness, in a workpiece block.

Quarried large stone block may have defects in the interior thereof.

Defects may appear on the surface of a workpiece, from an external impact or drilling process while mining stone.

As the gang saw blade is used in cutting a quarried workpiece, a large stone block, the blade may experience a relatively high force of change due to the non-uniformity in materials, thus resulting in a local abrasion on a steel blade to be then finally deviated therefor from a cutting path.

In an initial cutting operation of the gang saw blade, the blade goes downwards, toward the workpiece, in order to cut the workpiece, and then, only a portion of the blade may be in contact with the block of stone, the workpiece, and in particular, in the case of using multiple blades, only a portion of the blades may be in contact with the stone block in certain regions thereof. That is, the above-mentioned defects may occur on the blades.

Even in the case of one blade, a surface shape of the workpiece in contact with the blade may be different, depending upon respective positions thereof contacting the blade, from which a impact applied from the workpiece to the blade or deflection of the blade is uneven, such that a groove formed in the workpiece in the initial cutting operation may not be formed in a suitable position.

Particularly, a workpiece may be relatively long, for example, 2 m to 4 m in length, such that the workpiece may have a similarly sinuous and locally wide groove formed therein.

Since a blade receives tension stress on both surfaces thereof; when the blade is used to perform the cutting operation in such a manner that the blade is constrained in a groove formed in an abnormal position, as described above, even in the case in which the extent of the unevenness on the surface of the workpiece is not serious, a linear groove can be formed when cutting has been undertaken up to a certain depth level.

However, due to a serious indentation state or unevenness on the surface of a workpiece or on the inside thereof or due to an unstable cutting operation in the cutting system, the blade thereof may be greatly deviated from an original cutting position, thus causing the blade to be broken and thus damaged.

In addition, even in the case that breakage of the blade does not occur, since a linear groove cannot be formed therein, the thickness of slabs may exceed an allowable thickness and thus the slabs may be scrap-processed.

In order to reduce defects, during initial work, a descent speed of blade is relatively slow in order to reduce the extent of load applied to the blade, and when the blades in contact with the workpiece have entered the interior of the stone block to a proper depth level to allow all blades to come in contact with the stone block, that is, when all of the blades are in contact with the workpiece, the speed of the cutting operation is gradually increased up to a normal cutting speed.

However, the initial cutting operation is time consuming, and furthermore, an uneven load may be applied to the blades.

In addition to a peculiar defect of a workpiece, a technical defect may also occur in a cutting system as well as serious mechanical wear, producing defective products when cutting the workpiece such as granite or the like into a plurality of slabs, leading to highly priced products.

Therefore, an improved method or system for cutting a workpiece such as granite, marble, or rock into slabs is required.

DISCLOSURE

Technical Problem

An aspect of the present invention provides a workpiece for a frame gang saw, in which cutting time during an initial cutting operation on a workpiece can be significantly reduced using a frame gang saw and thus, productivity can be greatly improved and in which the quality of a product and a lifespan of a frame gang saw blade can also be improved by significantly decreasing deflection in the blade.

An aspect of the present invention also provides a method of cutting a workpiece using a frame gang saw, for manufacturing high quality products with a high level of productivity in cutting the workpiece provided according to the aspect of the present invention into several slabs to manufacture the products.

An aspect of the present invention also provides a product manufactured by cutting the workpiece according to an aspect of the invention into several slabs by using the cutting method provided according to the embodiment of the present invention.

Technical Solution

According to an aspect of the present invention, there is provided a workpiece for a frame gang saw, cut by a frame gang saw including one or a plurality of blades provided with multiple cutting tips, the workpiece including a groove which is formed in a surface thereof and into which at least a portion of at least one cutting tip, among the multiple cutting tips, is inserted, the groove being formed in a lengthwise direction of the workpiece. According to another aspect of the present invention, there is provided a workpiece for a frame gang saw, cut by a frame gang saw including a plurality of blades without including a cutting tip therein, the workpiece including a groove which is formed in a surface thereof and into which at least a portion of at least one cutting tip, among the multiple cutting tips, is inserted, the groove being formed in a lengthwise direction of the workpiece. According to another aspect of the present invention, there is provided a method of cutting a workpiece using a frame gang saw, the method including: inserting a blade of the frame gang saw into a groove formed in the workpiece, the workpiece having one or a plurality of grooves and the frame gang saw having multiple cutting tips; and reciprocating the blade to cut the workpiece.

According to another aspect of the present invention, there is provided a method of cutting a workpiece using a frame gang saw, the method including: inserting a blade of the frame gang saw into a groove formed in the workpiece, the workpiece having one or a plurality of grooves; and reciprocating the blade while spraying a grain form abrasive thereto to thus cut the workpiece.

According to another aspect of the present invention, there is provided a product manufactured by cutting a workpiece by inserting a blade of a frame gang saw into a groove in the workpiece, the workpiece having one or a plurality of grooves formed thereon.

Advantageous Effects

A workpiece having a groove formed thereon according to an aspect of the present invention is provided, in which cutting time during an initial cutting operation performed using a frame gang saw on a workpiece can be significantly reduced and thus productivity can be greatly improved and in which the quality of a product and a lifespan of a frame gang saw blade can be also improved by significantly decreasing deflection in the blade.

DESCRIPTION OF DRAWINGS

The above and other aspects, features and other advantages of the present invention will be more clearly understood from the following detailed description taken in conjunction with the accompanying drawings, in which.

MODE FOR INVENTION

Figure 1:
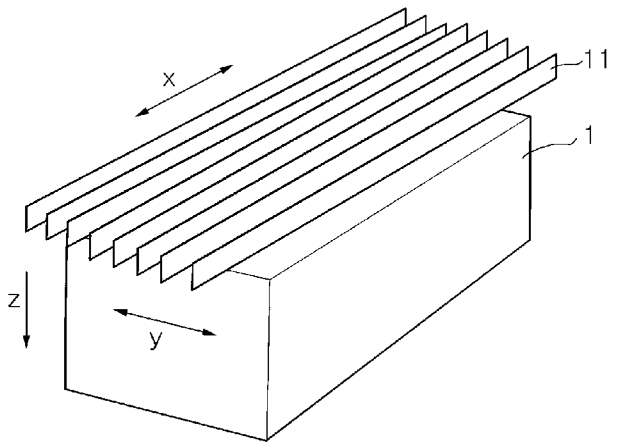
FIG. 1 illustrates a cutting process on a workpiece using a reciprocating multiplane-type frame gang saw provided with a plurality of blades.

Embodiments of the present invention will now be described in detail with reference to the accompanying drawings such that they could be easily practiced by those having skill in the art to which the present invention pertains. However, in describing the embodiments of the present invention, detailed descriptions of well-known functions or constructions will be omitted so as not to obscure the description of the present invention with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of other elements.

Hereinafter, an embodiment of the present invention will be described in detail.

When cutting a workpiece block into a plurality of slabs by using a reciprocating frame gang saw, in order to perform a rapid and stabilized cutting operation on the workpiece, the way in which an initial cutting action, during which relatively many defects may occur, is dealt with, as compared to other subsequent cutting processes using the frame gang saw, is important.

The inventors performed research into accomplishing a stabilized, simple and rapid cutting operation on a workpiece at the time of cutting the workpiece into slabs by using a frame gang saw including one or a plurality of blades which have multiple cutting tips provided therein or a frame gang saw including one or a plurality of blades which do not have a cutting tip therewith. As a result of the inventors' research, it was seen that a stabilized, simplified and rapid cutting operation could be obtained at the time of cutting a workpiece into a plurality of slabs, using a frame gang saw, as compared to the related art, by forming grooves in the workpiece in advance. Therefore, an embodiment of the present invention based on the above-mentioned research is provided as follows.

According to an embodiment of the present invention, there is provided a workpiece for a frame gang saw, cut by a frame gang saw including one or a plurality of blades that are provided with multiple cutting tips. The workpiece may be provided to include one or multiple grooves formed in a surface thereof, into which at least a portion of at least one cutting tip among the multiple cutting tips is inserted.

That is, the workpiece according to the embodiment of the present invention may include one or more grooves formed therein.

The number of grooves may correspond to the number of blades, but is not limited thereto, in other words, the number of grooves may be less or more than the number of blades.

In a case in which the frame gang saw is equipped with a plurality of blades, the grooves may be formed such that at least a portion of at least one cutting tip of at least one blade among the plurality of blades is inserted into the groove.

For example, when performing a cutting operation on a workpiece having multiple grooves formed therein by using a frame gang saw including a plurality of blades, it may be sufficient that a portion of at least one cutting tip of one blade is inserted into one groove. A workpiece having a groove satisfying this process condition is included in an embodiment of the present invention.

In addition, according to an embodiment of the present invention, a workpiece may include a groove or grooves such that a portion or all in all of cutting tips provided with one or a plurality of blades are inserted into the groove or the grooves.

Further, according to an embodiment of the present invention, there is provided a workpiece cut by a frame gang saw including a blade that does not have a cutting tip thereon. In this case, in a surface of the workpiece, one or multiple grooves maybe formed, into which at least a portion of at least one blade is inserted.

That is, the workpiece according to the present embodiment may have one or two grooves, or more, formed thereon.

Here, the number of grooves may correspond to the number of blades, but is not limited thereto, in other words, may be less or more than the number of blades.

In addition, in a case in which the frame gang saw is equipped with a plurality of blades, the groove may be formed such that at least a portion of at least one blade among the plurality of blades is inserted into the groove.

In this case, for example, when performing a cutting operation on a workpiece having multiple grooves formed therein by using the frame gang saw including the plurality of blades, it may be sufficient that a portion of at least one blade is inserted into one groove. A workpiece having a groove satisfying the process condition is included in an embodiment of the present invention.

In addition, according to an embodiment of the present invention, a workpiece may include a groove or grooves into which a portion of one blade or overall, or portions of all of the plurality of blades or overall are inserted.

A frame gang saw applicable to the workpiece according to the embodiment of the present invention is not particularly limited, for example, a reciprocating multiplane-type frame gang saw may be employed therefor.

In the case of cutting a workpiece that does not have a groove thereon, when, during an initial cutting operation, the surface of the workpiece comes into contact with the cutting tip or a cutting surface (lower surface) of the blade, the cutting tip or the blade is not constrained to a perpendicular direction (y-direction) to a movement direction of the blade. Thus, the cutting tip or blade may perform the cutting action while carrying out a right and left movement in a direction (y-direction) perpendicular to the movement direction of the blade.

An initial surface state of the workpiece may be uneven or vibrations in the blade receiving an impact from the workpiece may be generated, such that the cutting tip or blade is deviated from an original position thereof to thus form a groove in an abnormal position. When a groove has first been formed in the surface of the workpiece, vibrations of the blade may be gradually reduced such that the width of cut groove is relatively decreased. However, when the cutting action is progressing in the state in which the groove is formed to be deviated from the original position, the cutting operation may be performed in such a manner that the cutting tip or the blade is constrained to the groove. That is, a deviation in the thickness of cut slabs maybe caused. In particular, the blade which has deviated from the original position may increase the extent to which the blade is deviated from a cutting path as the cutting operation progresses.

The increased deviation extent of the blade from the cut path is not increased any longer according to reduction in the cutting speed, but in general, a blade initially deviated from the cut path is not returned to the original cutting position.

Furthermore, as the cutting tip or blade performs a movement in a perpendicular direction (y-direction) with regard to an original movement direction of the blade, a portion of a bottom surface of the cutting tip or blade maybe excessively detached due to vibrations generated in the perpendicular movement direction (y-direction) to the original movement direction of the blade, whereby a lifespan of the cutting tip or the blade may be sharply decreased. The excessive extent of a detachment of the lower surface from a portion of the cutting tip or the blade may increase a deviation extent of the blade from the cut path because a wear level on the lower face of the cutting tip or the blade is locally different.

Further, since the blade may perform the cutting operation on the workpiece in a state in which the blade has been deflected, a re-use rate thereof may be rapidly lessened because of an excessive deflected state thereof due to excessive stress applied thereto. In the case in which the extent therefor is relatively serious, a breakage during the cutting action may be generated. The breakage of the blade generated during the cutting operation may cause a great deal of lost time due to work stoppages. Moreover, the damaged blade may affect adjacent blades to bring about a great loss in the overall cutting work.

Therefore, in a case in which the groove is formed in a proper position, the cutting operation maybe started in a state in which the cutting tip or blade has been constrained to the groove, and in this case, the cutting tip or blade may be prevented from being deviated from the cutting position due to unevenness of the workpiece, thereby implementing a normal cutting operation.

The groove may be formed in a lengthwise direction, and a mean depth of the groove formed in the workpiece should be at least 1 mm.

Here, the mean depth of the grooves indicates a mean value of the depth of the grooves in an entire lengthwise direction of the workpiece in which the groove may be formed.

Figure 4:
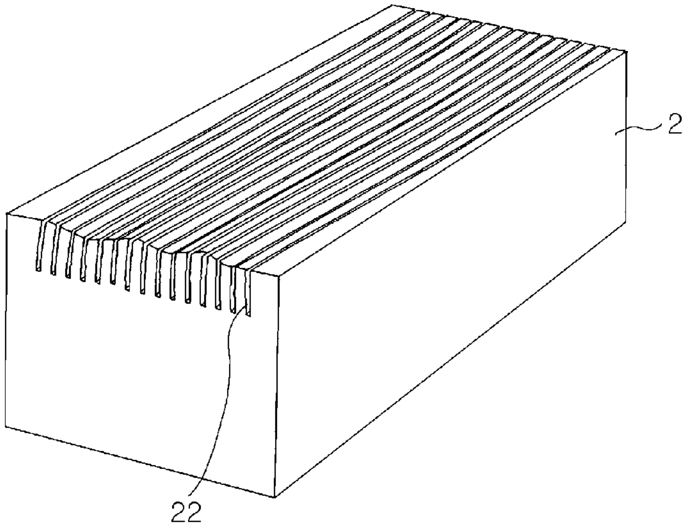
FIG. 4 shows an example of a workpiece having grooves formed therein according to an embodiment of the present invention.
Figure 7:
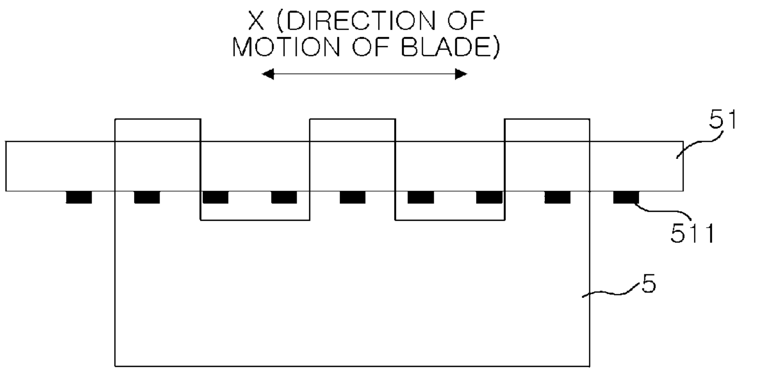
FIG. 7 illustrates a cutting process on a workpiece with grooves formed intermittently, according to an embodiment of the present invention.

For example, as shown in FIG. 4, in a case in which the surface of workpiece is comparatively even, and thus the groove can be formed with respect to an entire length of the workpiece in a lengthwise direction, a mean value of depth in the grooves over the entire length thereof may be a mean depth of the grooves. Further, as shown in FIG. 7, in a case in which the surface of the workpiece is projected and thus the groove can only be formed on a specific portion of the workpiece, the mean value of depth in the groove on the projected portion of the workpiece may be a mean depth of the grooves.

The groove may be formed with respect to the entire length of the workpiece in the lengthwise direction, but since in general, the workpiece may have an uneven surface, the groove may not be formed with respect to the entire length of the workpiece.

In a case in which the groove is formed to have a depth less than 1 mm, the groove may not sufficiently serve to constrain the cutting tip or blade thereto during the cutting operation.

Universally, the cutting tip may be formed to have the form of a square, but a corner thereof may become rounded due to a serious wear during the cutting operation. Therefore, when the depth of groove is about 1 mm, it may satisfy the condition in which even a rounded portion of a cutting tip may be sufficiently constrained to the groove.

Meanwhile, in a case in which the surface of the workpiece is uneven and when the mean depth of the grooves is about 1 mm, the surface of the workpiece may have a portion in which the groove is not formed. When the depth of the groove is about 1 mm, a portion of the surface in the workpiece in which the groove is formed may have the length slightly exceeding 50% of the entire cutting length of the workpiece. This portion is not in contact with the cutting tip or the blade during the initial cutting.

That is, since the level of a impact applied from the workpiece to the blade is uneven, the deflection state in the blade may be partially serious and a portion of the workpiece in which the cutting tip or the blade first is initially in contact with the workpiece may be a portion deviated from an original position in which the groove should be formed.

However, when the mean depth of the grooves is 3 mm or more, the length of the portion in which the groove is formed in the workpiece is about 60% to 70% of the entire length of the workpiece and thus, most of the cutting tips can carry out the cutting operation on the portion on which the groove has been formed. In addition, in the cutting tip or the blade placed on a portion in which the groove is not formed, the deflection thereof may be significantly reduced through a cutting tip or blade located and constrained to a groove provided near the portion on which the groove has been formed, thereby obtaining a similar effect to that in the groove formed all over the entire length of the workpiece in the lengthwise direction.

Therefore, the groove may be determined to have a mean length of 3 mm or higher.

In the frame gang saw, the blade may be configured to be coupled to an arm to perform a pendulum motion. Before the cutting depth attains a cutting level suitable for the cutting operation, the cutting tip or the blade may repeat a motion in which the cutting tip or the blade is deviated from the groove at a highest level in the pendulum motion and then returned to the groove to be inserted thereinto. When the blade is out of the groove, that is, when the blade becomes free from the state in which the blade is constrained to the groove; the blade temporarily has deflection occurring thereon, such that the blade cannot accurately enter the groove but may touch an outer wall of the groove. In this case, a lifespan may be shortened due to a partial breakage of the blade or the workpiece, or the cutting operation cannot be smoothly performed owing to irregular wear. A difference in the height of the blade may be different according to the length of an arm, an amplitude thereof and a position on which the blade is located, but may be generally 30 mm. Therefore, when the depth of the groove is 30 mm, the cutting tip or the blade can perform the cutting action without being deviated from the groove such that defects do not occur.

The mean depth of the groove maybe determined to be 30 mm or higher.

Moreover, in order to provide a stabilized cutting operation to the blade of the frame gang saw, the groove may need to be formed to have a sufficient depth. In a case in which the mean depth of the grooves formed in the workpiece is higher than the height of the blade which is a height including the cutting tip when the cutting tip is provided therein, the blade equipped with the frame gang saw may be more stabilized in the cutting action thereof.

That is, the mean depth of the grooves may be determined to be 100% to be equal to or higher than the blade height H.

For example, when the groove is formed to have a depth of about 30 mm, the blade may perform the cutting operation without deviating from the groove even during the reciprocating movement while increasing in cutting speed.

In addition, when the groove is formed to be deeper than the height of a general blade, a normal cutting speed may be obtained within a relatively short time.

In this case, the blade can be sufficiently inserted into the interior of the groove formed in the workpiece.

Ordinarily, the workpiece may also have uneven properties in the inside thereof. When local force is applied to the blade during the cutting operation, the blade or the cutting tip configured to be attached to the blade may deviate from the original position thereof.

However, as described above, when the groove is formed in the workpiece with sufficient depth, the blade may perform the cutting action in a state in which the blade is sufficiently inserted into the interior of the groove, and accordingly, the deflection of the blade occurring due to unevenness existing in the inside of the workpiece may not occur while being constrained by a side surface of the groove formed in the workpiece and can be returned to the original position thereof, thereby implementing a normal cutting operation. In particular, in the groove formed using another cutting unit, the groove of a linear form may be formed at a proper original position, and thus, an incidence of irregular wear or breakage of the blade or the cutting tip may be greatly reduced, achieving a rapid cutting operation of the workpiece.

As the workpiece according to an embodiment of the present invention, all things capable of being cut by a frame gang saw may be included therein, which are blocks of, for example, granite, marble, or the like, and may preferably be a block of granite, but are not limited thereto.

As a method of forming a groove with a predetermined depth in a workpiece according to an embodiment of the present invention, a circular saw, a wire saw or any other cutting tools may be used, but the present invention is not limited thereto.

Since it may only be satisfied by a groove formed in the surface of the workpiece, a cutting tool, which is not even for the purpose of the cutting for a deep insertion at the time of cutting, may be used.

According to an embodiment of the present invention, a cutting tool, which is capable of stably performing a cutting operation on the workpiece at a relatively high speed without being greatly affected by uneven surface characteristics of the workpiece, may be used.

In addition, according to an embodiment of the present invention, a cutting tool capable of forming a plurality of grooves on a workpiece at a time by using a multiplane-type saw may be used.

When a multiplane-type circular saw is used, the groove maybe formed, for example, ranging from a highest point of the workpiece to a point of 1000 mm downwards therefrom, through a rapid and stabilized cutting operation.

In a method of forming the groove, the multiplane-type circular saw may be generally used, and forming the groove as deep as possible may be economical by reducing an overall cutting time. However, in general, as the groove is deeper, the thickness of a steel core may be required to be thicker in order to enhance the stability of the cutting system. Accordingly, the depth of the groove should be determined to correspond to the thickness of the cutting tip or the blade of the frame gang saw. The depth of the groove should be determined in consideration of quality and economic factors.

In particular, in consideration of the width and linearity of the groove, a flange having a relatively large diameter may be used to increase a cutting stability of a steel core such that intervals between grooves form a uniform block and thus frame gang saw work as a subsequent process may be easy.

Since the surface of quarried large stone block is uneven, the depth of a groove from the surface of the large stone block may be different according to a position thereof.

However, when the groove is formed even on a portion of the surface of the large stone block, the cutting tip or the blade maybe easily located at a proper position during initial work.

When the groove is formed up to a portion of a lowest position on the surface of the workpiece, the portion in which the groove is formed is theoretically positioned on the same level with respect to an axis of a direction in which the workpiece is cut. In this case, when a cutting operation is started, the cutting tip or the blade may act entirely in contact with the workpiece, performing a stabilized cutting operation.

As such, at the time of cutting the workpiece having the groove formed therein to a predetermined depth according to an embodiment of the present invention, the cutting work may be carried out at a normal speed within a relatively short time, thereby greatly reducing an overall work time of the frame gang saw and also securing the cutting stability in the frame gang saw.

As a method of cutting a workpiece according to embodiments of the present invention there may be provided a method of cutting a workpiece by inserting a frame gang saw blade having a cutting tip provided therein, into a groove in the workpiece that has the groove formed according to the embodiment as described above, and reciprocating the blade; or a method of cutting a workpiece by inserting a frame gang saw with which the cutting tip is not attached, into a groove, spraying an abrasive such as a grain form steel shot to the interior of the groove, and reciprocating the blade of the frame gang saw.

The frame gang saw may be, for example, a reciprocating multiplane-type frame gang saw, but is not limited thereto.

The cutting tip attached to the blade may be formed to include a superabrasive. The superabrasive may be diamond, cubic boronitride (CBN), or a mixture of grains thereof, but is not limited thereto.

In the case of the circular saw, the wire saw, or the like ordinarily used for the cutting method to form a groove with a predetermined depth, the cutting speed may be rapid as compared to that in the frame gang saw, thus this method may be first used to form the groove with a depth which is sufficient to perform the stabilized cutting operation. After forming the groove, the cutting action may be performed using the frame gang saw, whereby the workpiece may be cut through stabilized and simplified cutting at a rapid speed.

In addition, according to an embodiment of the present invention there is provided a product provided by inserting a frame gang saw blade into a groove of a workpiece having the groove formed thereon as described above and then cutting the workpiece.

FIG. 1 illustrates a cutting process on a workpiece using a frame gang saw provided with a plurality of blades. When cutting the workpiece by using the frame gang saw, the plurality of blades 11 positioned in an x-direction may reciprocate to start a cutting operation on a workpiece 1 as shown in FIG. 1.

The workpiece 1 may be cut in a z arrow direction. A distance between the blades 11 in a y arrow direction may become a substantial thickness of a finished product.

Figure 2:
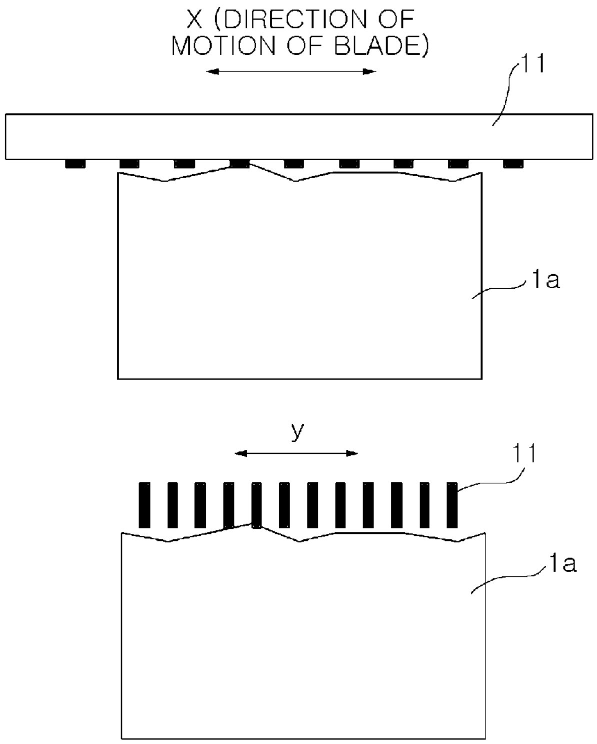
FIG. 2 illustrates a general cutting process on a workpiece using a reciprocating multiplane-type frame gang saw.
Figure 3:
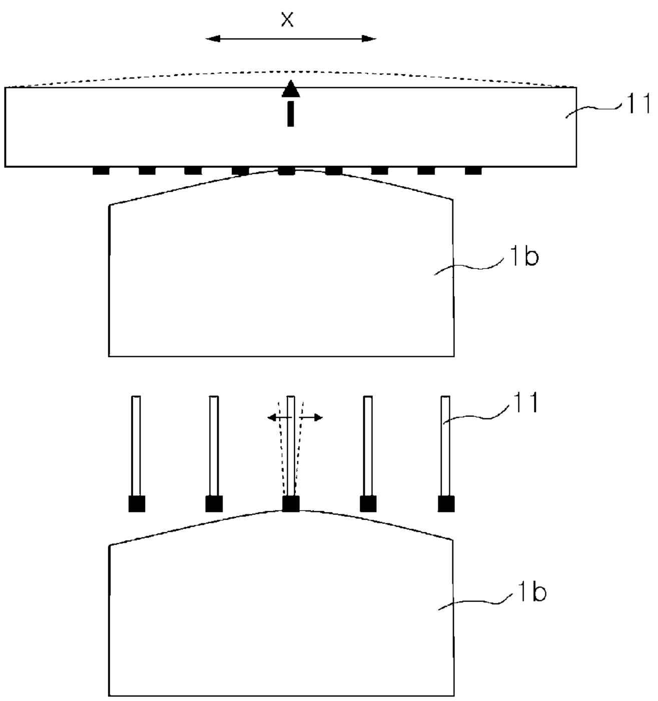
FIG. 3 schematically illustrates another general cutting process on a workpiece by using a reciprocating multiplane-type frame gang saw.

FIGS. 2 and 3 illustrate a cut state of general quarried workpieces. As shown in FIGS. 2 and 3, surfaces of quarried workpieces 1*a* and 1*b* maybe very uneven and the heights thereof maybe different according to portions thereof and the quarried workpieces may have the trace of a drilled hole.

As such, in a case in which the workpieces 1*a* and 1*b* with the uneven surface are cut, the blade 11 of a frame gang saw may be distorted or bent in an initial cutting process due to unevenness on the surfaces of the workpieces, and abrasive particles of a cutting tip of the blade may be detached and dropped.

FIG. 4 provides an example of a workpiece with grooves according to an embodiment of the present invention. As shown in FIG. 4, in a case in which a workpiece 2 according to an embodiment of the present invention has one or multiple grooves 22 formed in a surface thereof into which at least a portion of the cutting tip is inserted, local force applied to the blade 11 at the time of cutting the workpiece 2 may be eliminated or reduced to thus stabilize a cutting process using a frame gang saw.

Figure 5:
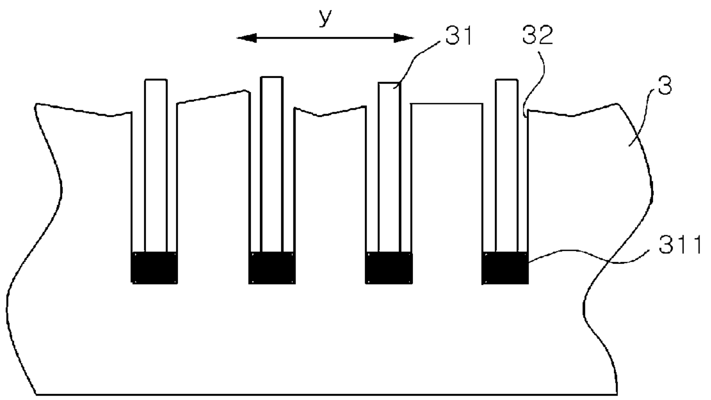
FIG. 5 shows a cutting process on a workpiece with grooves by using a reciprocating multiplane-type frame gang saw according to an embodiment of the present invention.
Figure 6:
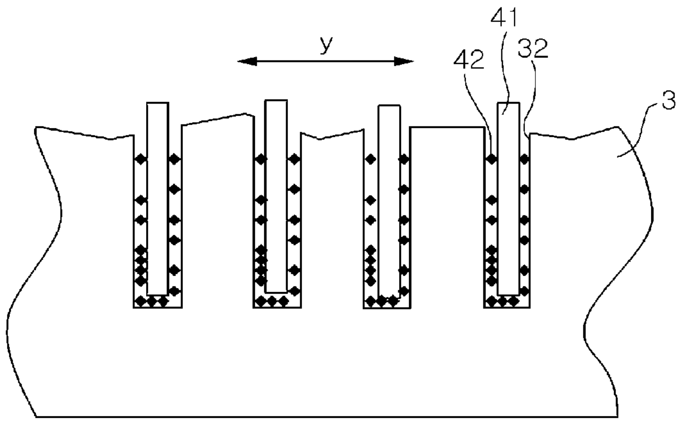
FIG. 6 shows a cutting process on a workpiece with grooves by using a reciprocating multiplane-type frame gang saw according to another embodiment of the present invention.

FIG. 5 illustrates a cutting process on a workpiece with grooves according to an embodiment of the present invention by using a frame gang saw provided with a plurality of blades having a plurality of cutting tips. FIG. 6 illustrates a cutting process on a workpiece with grooves according to an embodiment of the present invention by using a frame gang saw provided with a plurality of blades that do not have a cutting tip.

As shown in FIG. 5, for example, when a workpiece 3, in which grooves 32 with a predetermined depth have been formed in advance, is cut using a frame gang saw including a plurality of blades 31 that have cutting tips 311 provided therein; the blade 31 may be inserted into the groove 32 of the workpiece 3 to then reciprocate the blade 31 such that the workpiece 3 is cut into a plurality of slabs.

Meanwhile, when the workpiece 3, in which the groove 32, formed according to the embodiment of the present invention has been formed, is cut using the frame gang saw including a plurality of blades 41 that are not provided with a cutting tip; the blade 41 may be inserted into the groove 32 of the workpiece 3 to then reciprocate the blade 31 while spraying a grain form abrasive 42 thereto such that the workpiece 3 is cut into a plurality of slabs.

As described above, when the workpiece 3 with the grooves 32 having a predetermined depth is cut using the frame gang saw, bottom surfaces of the grooves in the workpiece 3 may be on the same level at a position in which the cutting tips 311 of the blades 31 or blades 41 (in a case in which the cutting tip is not provided therein) are in contact with the bottom surfaces. In such configuration, a maximum force applied to the blades 31 or 41 may be reduced and a local force applied thereto may be significantly reduced, thereby allowing for a complete cutting of the workpiece such as a block of granite or the like without the distortion or the bending of blades and without the detachment of cutting tips.

FIG. 7 illustrates a cutting process on a workpiece with grooves intermittently formed, according to an embodiment of the present invention.

Figure 8:
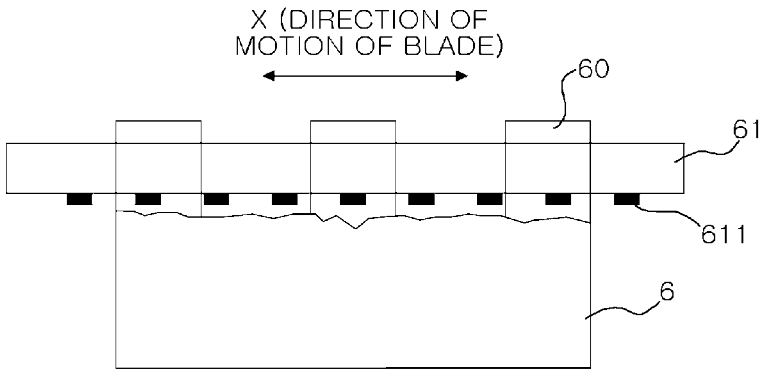
FIG. 8 illustrates a cutting process on a workpiece using an auxiliary unit with a groove according to an embodiment of the present invention.

FIG. 8 illustrates a cutting process on a workpiece using an auxiliary unit with a groove according to an embodiment of the present invention.

As shown in FIG. 7, a workpiece 5 having a protrusion part in which a groove is formed may be also provided according to an embodiment of the present invention.

According to the shape of the workpiece 5, grooves may not be formed consecutively along an overall lengthwise direction of the cutting direction, and also in this case, the effects according to the embodiment of the present invention may be fully implemented.

In FIG. 7, a reference numeral 51 indicates a blade and 511 indicates a cutting tip.

With reference to FIG. 7, although the groove is shown as being formed in only a portion of the workpiece, this case may also provide similar effects to that in the groove implemented in the general workpiece.

In this case, the mean depth of the grooves in the workpiece maybe a mean depth at regions in an overall longwise direction with respect to the protrusion parts.

Meanwhile, as shown in FIG. 8, for example, the workpiece may be cut by fixing an auxiliary unit 60 with grooves formed according to an embodiment of the present invention to a workpiece 6 of a square form.

With reference to FIG. 8, a reference numeral 61 indicates a blade and 611 indicates a cutting tip.

The auxiliary unit 60 may be fixed onto the workpiece through a molding or fastening method, and may be used in semipermanently as long as it is not broken, and therefore, work to form a groove may not be required.

Such an auxiliary unit may be manufactured using various materials such as concrete, a steel structure, or the like.

While the present invention has been shown and described in connection with the embodiments, it will be apparent to those skilled in the art that modifications and variations can be made without departing from the spirit and scope of the invention as defined by the appended claims.

The invention claimed is:

1. A method of cutting a stone using a reciprocating frame gang saw having flat blades with cutting tips, comprising:

using a cutting unit other than a frame gang saw to form in a lengthwise direction of the stone a plurality of linear grooves in an exposed uneven quarried surface of the stone, each groove varying in depth along the length of the groove because of the uneven quarried surface of the stone;

inserting respective blades of the reciprocating frame gang saw into the grooves in the stone prior to the stone being cut by the frame gang saw; and reciprocating the blades to cut the stone into a plurality of slabs; and wherein the blades are coupled to an arm to perform a pendulum motion, and wherein a mean depth of the grooves is greater than a height difference of the blade in the pendulum motion so that the blade may perform the cutting operation without deviating from the respective groove during the pendulum motion.

2. The method of claim 1, wherein the grooves formed in the uneven quarried surface of the stone have a mean depth of 30 mm or more.

3. The method of claim 1, wherein the grooves are formed using a circular saw or a wire saw.

4. The method of claim 1, wherein during reciprocation of the blades, abrasive grains are spayed into the interior of the groove to cut the stone into a plurality of slabs.

5. The method of claim 1, wherein a circular saw or a wire saw is used to form the grooves in the uneven quarried surface of the stone prior to inserting the blades of the frame gang saw into the grooves.

6. A method of cutting a stone using a reciprocating frame gang saw having flat blades with cutting tips, comprising:

using a cutting unit other than a frame gang saw to form in a lengthwise direction of the stone a plurality of linear grooves in an exposed uneven quarried surface of the stone, each groove varying in depth along the length of the groove because of the uneven quarried surface of the stone;

inserting respective blades of the reciprocating frame gang saw into the grooves in the stone prior to the stone being cut by the frame gang saw; and reciprocating the blades to cut the stone into a plurality of slabs; and wherein the mean depth of the grooves corresponds to 100% or more of a height of the blades, including a height of the cutting tip.

7. The method of claim 6, wherein the grooves are formed using a circular saw or a wire saw.

8. The method of claim 6, wherein during reciprocation of the blades, abrasive grains are spayed into the interior of the groove to cut the stone into a plurality of slabs.

9. The method of claim 6, wherein the grooves formed in the uneven quarried surface of the stone have a mean depth of 50 mm or more.

10. The method of claim 6, wherein a circular saw or a wire saw is used to form the grooves in the uneven quarried surface of the stone prior to inserting the blades of the frame gang saw into the grooves.

* * * * *